(12) United States Patent
Hakola et al.

(10) Patent No.: US 8,571,482 B2
(45) Date of Patent: Oct. 29, 2013

(54) DYNAMIC AUTONOMOUS RESOURCE ALLOCATION AND CHANNEL ACCESS IN CELLULAR SYSTEM UPLINK

(75) Inventors: Sami-Jukka Hakola, Kempele (FI); Samuli Turtinen, Ii (FI); Timo Koskela, Oulu (FI); Vinh Van Phan, Oulu (FI)

(73) Assignee: Nokia Corporation, Espoo (FI)

( * ) Notice: Subject to any disclaimer, the term of this patent is extended or adjusted under 35 U.S.C. 154(b) by 497 days.

(21) Appl. No.: 12/880,099

(22) Filed: Sep. 11, 2010

(65) Prior Publication Data

US 2012/0064935 A1 Mar. 15, 2012

(51) Int. Cl.
*H04B 1/00* (2006.01)

(52) U.S. Cl.
USPC ............ 455/63.1; 455/67.11; 455/67.13; 455/114.2; 370/252

(58) Field of Classification Search
USPC ............ 455/63.1, 67.11, 67.13, 114.2, 278.1, 455/296, 522, 13.4; 370/252, 329
See application file for complete search history.

(56) References Cited

U.S. PATENT DOCUMENTS

| | | | | |
|---|---|---|---|---|
| 5,914,944 | A * | 6/1999 | Haugli et al. | 370/320 |
| 6,950,671 | B2 * | 9/2005 | Hamabe | 455/522 |
| 7,181,170 | B2 * | 2/2007 | Love et al. | 455/67.13 |
| 7,340,267 | B2 * | 3/2008 | Budka et al. | 455/522 |
| 7,353,025 | B2 * | 4/2008 | Ahn et al. | 455/434 |
| 7,515,913 | B2 * | 4/2009 | Hiddink et al. | 455/453 |
| 7,532,895 | B2 * | 5/2009 | Hrastar | 455/456.1 |
| 8,145,206 | B2 * | 3/2012 | Kazmi et al. | 455/423 |
| 8,219,030 | B2 * | 7/2012 | Gorokhov et al. | 455/62 |
| 2005/0227624 | A1 * | 10/2005 | Hiddink et al. | 455/62 |
| 2008/0261570 | A1 * | 10/2008 | Baker et al. | 455/414.1 |
| 2009/0023467 | A1 * | 1/2009 | Huang et al. | 455/522 |
| 2010/0054237 | A1 | 3/2010 | Han et al. | |
| 2010/0238825 | A1 * | 9/2010 | Zhang et al. | 370/252 |
| 2010/0290407 | A1 * | 11/2010 | Uemura | 370/329 |
| 2012/0252468 | A1 * | 10/2012 | Gorokhov et al. | 455/447 |

OTHER PUBLICATIONS

Mehdi Bennis et al., "D1.2: Initial Report on System Aspects of Flexible Spectrum Use," 1.0, Jan. 20, 2009, pp. 1-63, Winner+, Celtic Telecommunication Solutions, Retrieved from WWW on Dec. 17, 2010 at <projects.celtic-initiative.org/winner+/Winner+%20Deliverables/D1.2_v1.0.pdf>.

Luis G. U. Garcia et al., "Autonomous Component Carrier Selection: Interference Management in Local Area Environments for LTE-Advanced," FEMTOCELL Wireless Communications, IEEE Communications Magazine, Sep. 2009, pp. 110-116, IEEE.

Vision 2020, 50 Billion Connected Devices, Ericsson AB, Dec. 2009, pp. 1-9, Retrieved from WWW on Dec. 17, 2010 at <slideshare.net/EricssonFrance/vision-2020-50-billion-connected-devices-ericsson>.

(Continued)

*Primary Examiner* — Minh D Dao
(74) *Attorney, Agent, or Firm* — Squire Sanders (US) LLP

(57) ABSTRACT

Methods, apparatuses, and software can be provided for dynamic autonomous resource allocation and channel access in a cellular system uplink. A method can include measuring interference levels on uplink resources of a victim cell and calculating a probability of accessing channels of the uplink resources of the victim cell using the measured interference levels, including defining a suitable transmission power, and a highest value and a lowest value. The method can further include accessing a channel for which the probability of accessing has been calculated, when the probability meets a predetermined condition.

17 Claims, 5 Drawing Sheets

(56) References Cited

OTHER PUBLICATIONS

Rajiv Laroia, "Future of Wireless? The Proximate Internet," COMSNETS, Jan. 7, 2010, pp. 1-38, Qualcomm, Retrieved from WWW on Dec. 17, 2010 at <cedt.iisc.ernet.in/people/kuri/Comsnets/Keynotes/Keynote-Rajiv-Laroia.pdf>.

Hongnian Xing et al., "The Investigation of Power Control Schemes for a Device-to-Device Communication Integrated into OFDMA Cellular System", 21st Annual IEEE International Symposium on Personal, Indoor and Mobile Radio Communications, 2010, pp. 1775-1780.

Bo Yang et al., "Channel-Aware Access for Cognitive Radio Networks", IEEE Transactions on Vehicular Technology, vol. 58, No. 7, Sep. 2009, pp. 3726-3737.

Sami Hakola et al., "Device-to-Device (D2D) Communication in Cellular Network—Performance Analysis of Optimum and Practical Communication Mode Selection", IEEE Communications Society, 2010, pp. 1-6.

Xiangwei Zhou et al., "Probability-Based Transmit Power Control for Dynamic Spectrum Access", IEEE, 2008, pp. 1-5.

International Search Report application No. PCT/IB2011/053902 dated Dec. 15, 2011.

* cited by examiner

DYNAMIC AUTONOMOUS RESOURCE ALLOCATION AND CHANNEL ACCESS IN CELLULAR SYSTEM UPLINK

BACKGROUND

1. Field

Dynamic, autonomous resource allocation and channel access can take place while using an overlaying cellular system uplink. For example, a local node can make measurements and calculate a probability of access on various channels, either acting individually or in cooperation with other local nodes or cluster nodes.

2. Description of the Related Art

Resource allocation in femto cells may have various prerequisite requirements. For example, in a synchronization method for femto-cell base stations in uncoordinated communication networks, the femto cell in question can obtain synchronization information from one other base station, and can adjust its own clock in response to the synchronization information. The timing synchronization information can be identified from a strongest synchronization signal from among nearby uncoordinated base stations. The timing synchronization can accommodate clock offsets and frequency offsets. Autonomously communicating devices could then determine suitable timing for their local operation in the cellular system uplink.

Deployment of femto cells with flexible spectrum use aiming at utilizing opportunistically overlaying cellular system uplink resources may encounter certain challenges. For example, when the local nodes or the cognitive femto cell of interest are deployed far enough away from the "victim" eNB to avoid causing any interference to that eNB, the femto cell may not be able to determine whether it is far enough away from the eNB, or how to select the most suitable carrier.

SUMMARY

In certain embodiments, a method includes measuring, by a local device, interference levels on uplink resources of a victim cell. The method also includes calculating a probability of accessing channels of the uplink resources of the victim cell using the interference levels measured by the local device, wherein the calculating the probability comprises defining a suitable transmission power, and a highest value and a lowest value. The method further includes accessing, by the local device, a channel for which the probability of accessing has been calculated, when the probability meets a predetermined condition.

In further embodiments, a method includes forming collective high and low values from interference measurements performed by a plurality of local devices. The method also includes calculating and deciding access for the plurality of local devices. The method further includes controlling the access of the plurality of local devices based on the calculating and deciding.

In additional embodiments, an apparatus includes at least one memory including computer program cod and at least one processor. The at least one memory and the computer program code are configured to, with the at least one processor, cause the apparatus at least to measure interference levels on uplink resources of a victim cell. The at least one memory and the computer program code are also configured to, with the at least one processor, cause the apparatus at least to calculate a probability of accessing channels of the uplink resources of the victim cell using the interference levels measured by the apparatus, wherein calculating the probability of accessing channels comprises defining a suitable transmission power, and a highest value and a lowest value. The at least one memory and the computer program code are further configured to, with the at least one processor, cause the apparatus at least to access a channel for which the probability of accessing has been calculated, when the probability meets a predetermined condition.

In other embodiments, an apparatus includes at least one memory including computer program code and at least one processor. The at least one memory and the computer program code are configured to, with the at least one processor, cause the apparatus at least to form collective high and low values from interference measurements performed by a plurality of local devices. The at least one memory and the computer program code are also configured to, with the at least one processor, cause the apparatus at least to calculate and decide access for the plurality of local devices. The at least one memory and the computer program code are further configured to, with the at least one processor, cause the apparatus at least to control the access of the plurality of local devices based on the calculating and deciding.

In additional embodiments, an apparatus includes measuring means for measuring interference levels on uplink resources of a victim cell. The apparatus also includes calculating means for calculating a probability of accessing channels of the uplink resources of the victim cell using the interference levels measured by the measuring means, wherein the calculating means comprises defining means for defining a suitable transmission power, and a highest value and a lowest value. The apparatus further includes accessing means for accessing, by the apparatus, a channel for which the probability of accessing has been calculated, when the probability meets a predetermined condition.

In further embodiments, an apparatus includes forming means for forming collective high and low values from interference measurements performed by a plurality of local devices. The apparatus also includes processing means for calculating and deciding access for the plurality of local devices. The apparatus further includes controlling means for controlling the access of the plurality of local devices based on the calculating and deciding.

In other embodiments, a computer-readable medium is encoded with instructions that, when executed in hardware, perform a process. The process includes forming collective high and low values from interference measurements performed by a plurality of local devices. The process also includes calculating and deciding access for the plurality of local devices. The process further includes controlling the access of the plurality of local devices based on the calculating and deciding.

In certain embodiments, a computer-readable medium is encoded with instructions that, when executed in hardware, perform a process. The process includes measuring, by a local device, interference levels on uplink resources of a victim cell. The process also includes calculating a probability of accessing channels of the uplink resources of the victim cell using the interference levels measured by the local device, wherein the calculating the probability comprises defining a suitable transmission power, and a highest value and a lowest value. The process further includes accessing, by the local device, a channel for which the probability of accessing has been calculated, when the probability meets a predetermined condition.

BRIEF DESCRIPTION OF THE DRAWINGS

For proper understanding of the invention, reference should be made to the accompanying drawings, wherein.

DETAILED DESCRIPTION OF THE PREFERRED EMBODIMENT(S)

Figure 1:
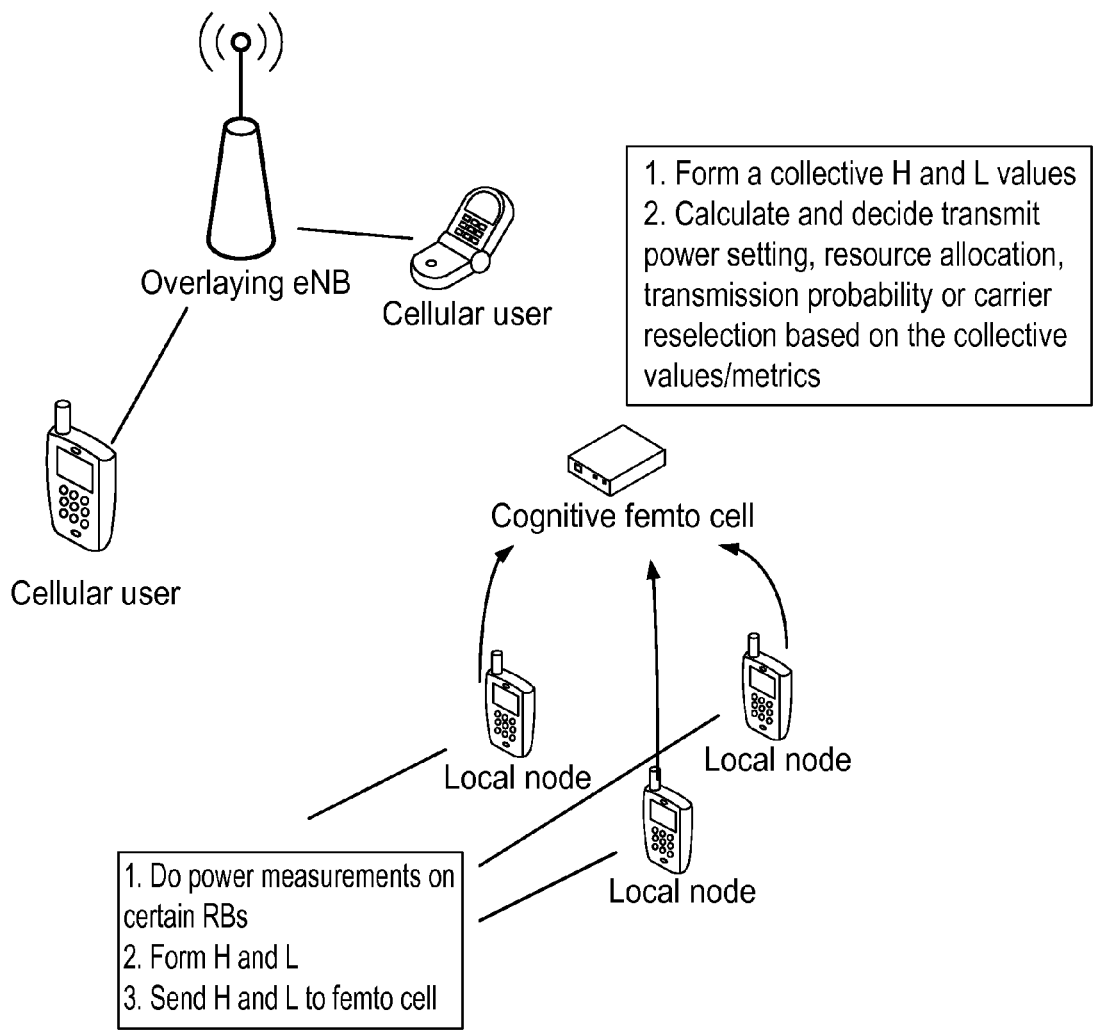
FIG. 1 illustrates a system according to certain embodiments of the present invention.

Integration of new network topologies into a cellular network topology has lead to, for example, heterogeneous networks. Heterogeneous networks can include a deployment of macros, micros, picos, femtos and relays in the same spectrum. Long term evolution (LTE)/LTE advanced (LTE-A) of the third generation partnership project (3GPP). A further level of progress is to enable heterogeneous local communication directly among devices and machines, either with or without supervision of the network, as well as autonomous operation of femto cells. The autonomous operation of femto cells can also be referred to as cognitive femtos.

Heterogeneous networks in the local domain can include network controlled or autonomous device-to-device (D2D) communication including communication in the clusters of devices. Such networks can also include grid/group of local machines communicating performing certain tasks in co-operative way. Moreover, such networks can include an advanced device acting as a gateway for a bunch of low-capability devices or machines to access the network. Furthermore, such networks may have autonomous femto cell operation.

The integration of a local heterogeneous communication system into a cellular network means that the devices try to find and use radio resources of the cellular system using as low amount of network assistance as possible and without causing interference to the cellular users. The actual local communication takes place on uplink resources of the cellular network due, for example, to the following reasons: regulatory issues may prevent transmitting on downlink by devices of the D2D pair, it may be easier to control interference from D2D devices to cellular devices, D2D devices can maintain synchronization to the network via listening downlink common channels, paging devices by the network also possible, and locally communicating devices may have also cellular bearers configured or to be configured in addition to the local communication bearers.

In one cell, common resource shared by number of local communication device groups could be allocated. The individual local cells may be allowed and facilitated to utilize common D2D resources to serve local users with further advanced access purposes. For instance, the common D2D resources may be utilized as a common contention-based direct access channel in uplink of the local cells across the D2D registration area. The registered D2D users or other authenticated mobile users may access the channel for sending data and control messages. Furthermore it is assumed that to minimize control signal overhead the contention-based channel access could be applied for the considered heterogeneous local communication on the shared resource.

To handle interference and to provide an efficient channel access scheme, a contention-based mechanism could utilize a dynamic variable to determine the probability of whether or not to access the channel. The setting of the probability can be dynamic. The probability can be set as a function of the measured interference and the set target received power level or allowed transmission power of the local communication as shown, by way of example, in Equation (1) below:

$$p_{access\_channel} \propto \max(0, P\_0_{local} + \text{offset} - \max(I_{measured}, I_{min}))/(P\_0_{local} + \text{offset} - I_{min})$$

where $P\_0_{local}$ is a parameter set by an enhanced Node B (eNB) to correspond to P_0 in fractional power control of the LTE uplink, offset is a parameter to adjust the range in which greater than zero probabilities exist related to certain $P\_0_{local}$, $I_{measured}$ interference measured by the local communication device, and $I_{min}$ a parameter configured by the eNB to indicate the interference level for which the channel access probability is 1.

Certain embodiments of the present invention are related to cognitive local nodes that try to operate opportunistically, overlaying cellular system uplink resources. In doing so, devices that are willing to do local communication may need to find and get resources with minimal network assistance, minimal interference impact on cellular users, and minimal power consumption.

The channel access scheme discussed above may rely on the parameter $P\_0_{local}$ set by the network via downlink signaling. It may, however, be beneficial if no downlink reception is required to establish local communication on uplink resources. One further benefit could be further applicability of the channel access scheme to the case of cellular system uplink resources allocated onto unlicensed spectrum, coupled with downlink on licensed spectrum, to utilize unlicensed spectrum used by cellular uplink for local communication.

For cognitive femto cells opportunistically utilizing overlaying cellular system uplink resources, such femto cells may be configured to select the most suitable carrier and to set the proper transmit power, so as not to cause intolerable interference towards victim eNBs and regular cellular users thereof. Thus, means and methods can be set up to minimize dependency of the local channel access scheme, for D2D users and cognitive femto cells, on cellular control. The minimization of dependency can even extent to obviating the need for cellular system downlink reception, particularly for those devices and femto cells operating in cellular uplink resources.

In certain embodiments, local devices may measure interference levels on different uplink resources of a victim cell of overlaying cellular systems in the accuracy of one physical resource block (PRB). A local device may include, for example, D2D devices, cognitive femto nodes, and user devices thereof. It keeps up-to-date information of the highest interference power level in sliding-window measurement period. Using that knowledge, individually or collectively, together with measured interference power level on candidate data transmission resources, the devices may calculate a suitable transmission power level for local data transmissions, as well as trigger and determine carrier reselection autonomously.

An example of using the knowledge individually is using the knowledge in distributed D2D with contention based channel access. Examples of using the knowledge collectively including using the knowledge in centralized, cognitive femto cells or cluster-based master-slave D2D communications.

In centralized cases, a cognitive femto node or a cluster head may collect the intended measurement reports from its users or peers and make a collective decision in setting the transmit power levels for the cluster or femto cell. The collected measurement reports may also be used to reselect another carrier, if a minimum power level cannot be ensured as required. The femto node or cluster head may configure or agree with its users or peers for the aforementioned measurement and reporting in an efficient cooperative manner. Thus, for example, the devices may divide up the work of measuring across all the PRBs or all the time. Thus, one device may measure half of the time, or half of the PRBs, for example. How such measurement is apportioned may be subject to an optimality tradeoff between processing need, signaling overhead, and performance.

The local devices can achieve local synchronization according to any existing method. Thus, the local devices can know transmission time interval (TTI) and slot boundary of cellular users in few us accuracy. Thus, the interference power measurements needed for determining channel access probability on certain resource can be done in the beginning of the TTI of cellular users to determine on which resources it could be sensible to do data transmission. To determine the suitable transmission power level, the device can do interference level measurements on physical uplink shared channel (PUSCH) resources of cellular users. The measurement samples can be stored in a sliding window table. The length of the table can have a size inverse proportional to a velocity of the observing device. An example table is illustrated in Table 1, below. Time instant t, in Table 1, refers to a current TTI of cellular users during which the local device could also transmit the data of the local device.

TABLE 1

Measurement samples for determining suitable transmission power

| Channel resource index | Time | | |
| --- | --- | --- | --- |
| | t − windowSize | ... | t − 1 | t |
| 1 | $value_{cch}(1, (t-windowSize))$ | ... | $value_{cch}(1, (t-1))$ | $value_{cch}(1, t)$ |
| ... | ... | ... | ... | ... |
| M | $value_{cch}(M, (t-windowSize))$ | ... | $value_{cch}(M, (t-1))$ | $value_{cch}(M, t)$ |

Define the highest value, H, according to Equation (2), as shown below:

$H = \max(value_{cch}(1,(t-windowSize)), \ldots, value_{cch}(1,t), \ldots, value_{cch}(M,(t-windowSize)), \ldots, value_{cch}(M,t))$ and define the lowest value, L, according to Equation (3), as shown below:

$L = \min(value_{cch}(1,(t-windowSize)), \ldots, value_{cch}(1,t), \ldots, value_{cch}(M,(t-windowSize)), \ldots, value_{cch}(M,t))$ The local device can also use the set of performed power level measurements to track resources candidate for the data transmission. Beforehand, the local device may have received via a broadcast, or by any other way, the possible resources (marked as N here) on which it may transmit data. Note that the set N does not need to be a subset of H. The larger the set M is, the more reliable or safe the power setting and channel access can be achieved.

The device, after a measurement period, could form a table of measurement samples in the following way:

TABLE 2

Measurement samples for determining suitable resource for the transmission

| Transmission resource index j | Time T |
| --- | --- |
| 1 | $value_{data}(1, t)$ |
| ... | ... |
| N | $value_{data}(N, t)$ |

Based on the measurements, and utilizing them in the calculations, either one transmission probability can be formed over all resources (N) together with one allowed power level, case 1, or one transmission probability can be formed for each resource together with allowed power level, case 2.

Case 1:

Suitable transmission power may be expressed as set forth in Equation (4), below.

$p \sim H - margin + offset,$ where margin is a backoff to reduce interference impact on the overlaying cellular system, and offset is parameter to take into account all the losses due to transmitter impairments and other losses within a one meter range from the transmitter. If there were a co-located receiver observing the transmission, the received power level should be (H−margin).

Access probability in case 1 may be expressed according to Equation (5), as shown below:

$p_{channelAccess} = \max(0, p - \text{mean}(value_{data}(1,t), \ldots, value_{data}(j,t))/(p-L)$ Case 2:

Suitable transmission power could still be defined as in Equation (4), set forth in discussion of case (1). Access probability then can be determined for each candidate transmission resource j, as shown below in Equation (6):

$p_{channelAccess,j} = \max(0, p - value_{data}(j,t))/(p-L)$

For centralized cases of cognitve femto cells or D2D clusters, a femto node or a cluster head (CH) may collect such the H and L from individual users or peers, as configured, in order to form a collective H and L values needed. The femto node or cluster head can then base its calculation and decision in transmit power setting, resource allocation, transmission probability or carrier reselection on the collective metrics.

An illustration of collective metric calculation by a cognitive local cell opportunistically utilizing uplink resources of the overlaying cellular network is provided in FIG. 1.

As shown in FIG. 1, an overlaying cellular network can include an overlaying eNB and multiple cellular users. The cellular users shown are illustrated by different kinds of cellular devices, and further kinds of cellular devices, such as laptop computers with wireless cards, or sensor stations with wireless access capabilities, are also permitted. Indeed, any kind of device that can communicate with a cellular access point, such as an eNB, can be part of the overlaying cellular network. Other kinds of overlaying wireless networks are also possible, with an overlaying cellular network serving as an illustrative example.

As can be seen in FIG. 1, there may also be a cognitive femto cell including a so-called femto node or cluster head (CH), with which local nodes can communicate. The local nodes here are shown as one kind of cellular phone, but any other kind of local node is permitted. The local node is not required to have the ability to receive downlink communication from the eNB in certain embodiments of the present invention.

In operation, as shown in FIG. 1, each of the local nodes can do power measurements on certain resource blocks (RBs). The local nodes can individually form an H and an L value, as discussed above. Then, the local nodes can send the H and L values to the head or femto node of the femto cell.

The cognitive femto cell head or femto node can then form collective H and L values based on the received individual H and L values. In view of the fact that a collective H and L value is going to be produced, the femto cell head or femto node can assign different resource blocks for monitoring and measuring by the individual local nodes. Thus, one third of the resource blocks can be handled by a first of the three illustrated local nodes, and the other two thirds can be shared between the other two local nodes. The example of three local nodes is just one possibility. Other femto cells may include more or fewer local nodes.

Various advantages may belong to certain embodiments of the present invention. For example, certain embodiments of the present invention can provide a new channel access mechanism integrated into uplink of the overlaying cellular system for autonomously operating local devices. In other embodiments, or the same embodiments, there may be no need to listen downlink transmission from a primary system's base station in order to get accessed onto a channel. Other advantages include the fact that certain embodiments of the present invention can also be utilized by ad hoc femto cells operating on uplink resources of an overlaying cellular network.

Figure 2:
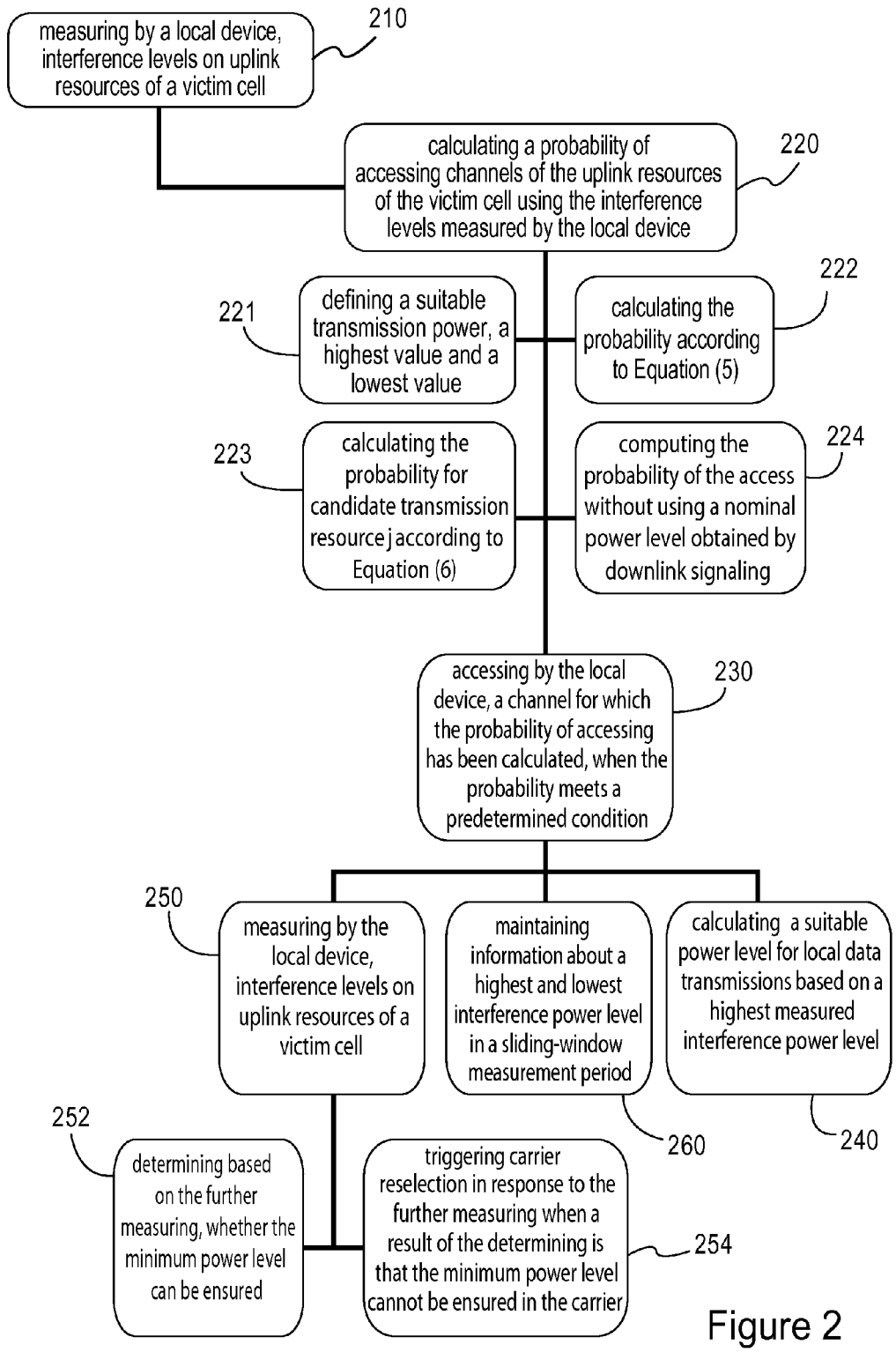
FIG. 2 illustrates a method according to certain embodiments of the present invention.

FIG. 2 illustrates a method according to certain embodiments of the present invention. As shown in FIG. 2, the method includes measuring 210, by a local device, interference levels on uplink resources of a victim cell. The local device can be a cell phone or other communication device that is configured for local communication, such as communication in a femto cell or similar network. The local device can also be configured for communication in other networks, such as a cellular network. The method can be performed with a granularity of one physical resource block.

The method also includes, in this example, calculating 220 a probability of accessing channels of the uplink resources of the victim cell using the interference levels measured by the local device. The calculating 220 can include defining 221 a suitable transmission power, and a highest value and a lowest value. The calculating 220 can further include calculating 222 the probability according to Equation (5). The calculating 220 can alternatively include calculating 223 the probability for candidate transmission resource j according to Equation (6). The probability of the access can be computed 224 without using a nominal power level obtained by downlink signaling. By nominal power level, it should be understood that this can include a parameter $P\_0_{local}$ set by the network via downlink signaling, or the set target received power level or allowed transmission power.

The method, in this instance, further includes accessing 230, by the local device, a channel for which the probability of accessing has been calculated, when the probability meets a predetermined condition. The predetermined condition may be that the channel has been calculated as having the highest probability of access, or it has been calculated as having at least a minimum probability of access. In certain embodiments, the predetermined condition may be receipt of some kind authorization from a cluster head or femto node, particularly when a cooperative approach to determining access among cluster members is employed.

The method can further include calculating 240 a suitable power level for local data transmissions based on a highest measured interference power level. In other words, based on the obtained measurements, the local device (or some other device in the system) can calculate a suitable power level for local transmissions. The power level can be set to overcome expected interference, avoid unnecessary interference with other devices, or simply conserve energy.

The method can additionally include further measuring 250, by the local device, interference levels on uplink resources of a victim cell, determining 252, based on the further measuring, whether the minimum power level can be ensured, and triggering 254 carrier reselection in response to the further measuring when a result of the determining is that the minimum power level cannot be ensured in the carrier.

The method can also include maintaining 260 information about a highest interference power level and a lowest interference power level in a sliding-window measurement period. The measurement period can have a length inversely proportional to a speed of the local device.

Figure 3:
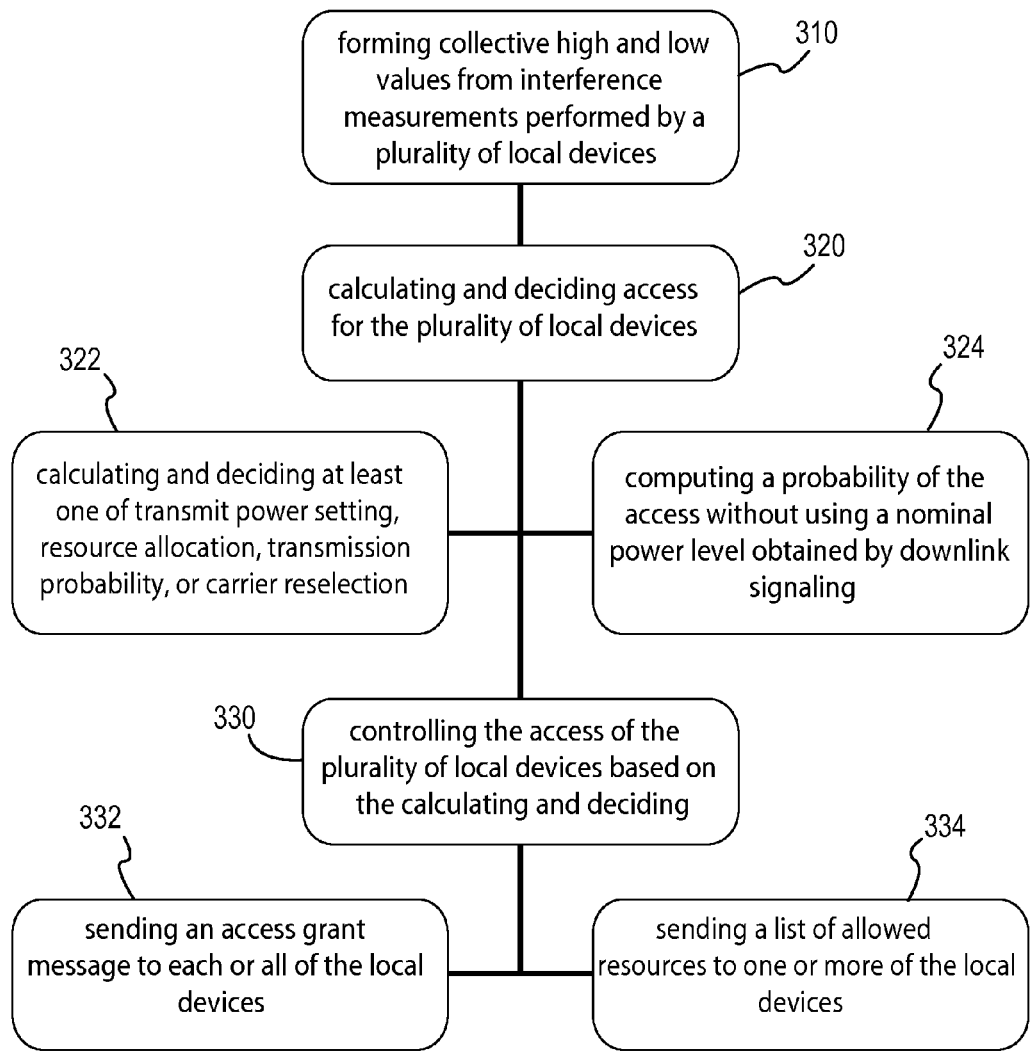
FIG. 3 illustrates a method according to certain embodiments of the present invention.

FIG. 3 illustrates a method according to another embodiment of the present invention. As shown in FIG. 3, a method can include forming 310 collective high and low values from interference measurements performed by a plurality of local devices. The forming collective high and low values can be based on processing received individual high and low values from the plurality of local devices.

The method can also include calculating and deciding access 320 for the plurality of local devices. The calculating and deciding the access 320 can include calculating and deciding 322 at least one of transmit power setting, resource allocation, transmission probability, or carrier reselection. In this method, a probability of the access can be computed 324 without using a nominal power level obtained by downlink signaling, and the probability of the access can be used in the calculating and deciding 320 the access.

The method can further include controlling 330 the access of the plurality of local devices based on the calculating and deciding. This controlling 330 the access can involve sending 332 an access grant message to each or all of the local devices. The controlling 330 the access can involve sending 334 a list of allowed resources to one or more of the local devices.

The methods of FIGS. 2 and 3 can be implemented in various ways. For example, the methods of FIGS. 2 and 3 can be implemented in hardware or in software running on hardware, or by any combination thereof. Thus, for example, a computer-medium can be encoded with instructions that, when executed in hardware, perform one or more of the methods discussed above. The computer-readable medium can be a non-transitory medium or storage medium.

Figure 4:
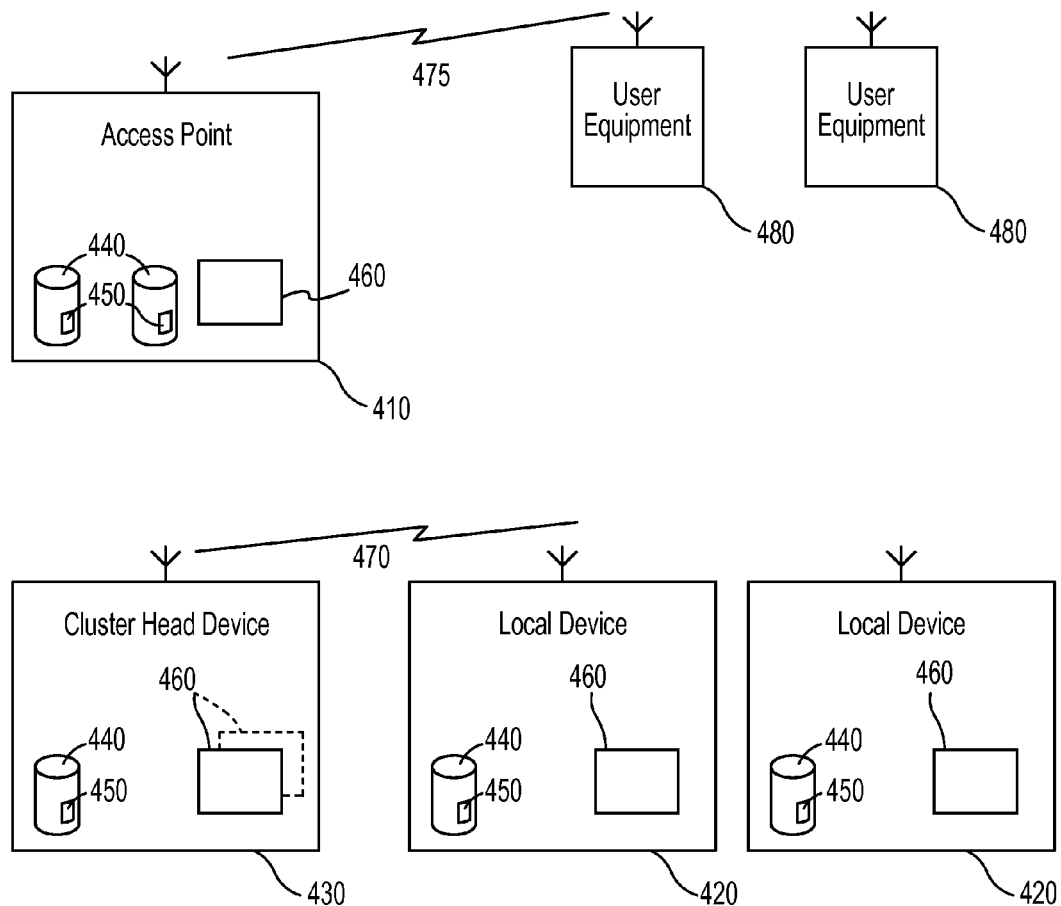
FIG. 4 illustrates a system according to certain embodiments of the present invention.

FIG. 4 illustrates a system according to certain embodiments of the present invention. The system includes an access point 410, two or more local devices 420, and cluster head device 430. The local devices 420, cluster head device 430, as well as the access point 410 can include at least one memory 440, including computer program code 450. The memory 440 can be any suitable storage device, such as read-only memory (ROM), random-access memory (RAM), or the like, and can be a separate chip, separate disk, or part of an integrated chip that includes both storage and other functionality. The computer program code 450 can be any suitable set of computer instruction, such as a compiled or interpreted computer program.

The local devices 420, cluster head device 430, as well as the access point 410 can also include at least one processor 460. The processor 460 can be any computing device, such as a controller, central processing unit (CPU), general purpose computer, or application specific integrated circuit (ASIC).

The processor 460 be on the same chip with the memory 440, or alternatively can be on a different chip, or even in a different case.

The at least one memory 440 and the computer program code 450 can be configured, together with the at least one processor 460 to perform various processes, as will be discussed below. The configuration of the memory 440, computer program 450, and processor 460 may yield a particular machine that is an embodiment of the present invention.

The local devices 420 and the cluster head device 430 can communicate over a wireless communication link 470. Likewise, the access point 410 can communicate with user equipment 480 over a wireless communication link 475. The wireless communication links 470, 475 can share the same spectrum, and consequently the wireless communication link 470 for the cluster or femto cell may operate on a lower power than the wireless communication link 475 for the cellular network.

In the example of a local device 420, the at least one memory 440 and the computer program code 450 can be configured to, with the at least one processor 460, cause the local device 420 at least to measure interference levels on uplink resources of a victim cell. The at least one memory 440 and the computer program code 450 can also be configured to, with the at least one processor 460, cause the local device 420 at least to calculate a probability of accessing channels of the uplink resources of the victim cell using the interference levels measured by the apparatus. The at least one memory 440 and the computer program code 450 can further be configured to, with the at least one processor 460, cause the local device 420 at least to access a channel for which the probability of accessing has been calculated, when the probability meets a predetermined condition.

The at least one memory 440 and the computer program code 450 can be configured to, with the at least one processor 460, cause the local device 420 at least to further measure interference levels on uplink resources of a victim cell, determine, based on the further measuring, whether the minimum power level can be ensured, and trigger carrier reselection in response to the further measuring when a result of the determining is that the minimum power level cannot be ensured in the carrier.

Additionally, the at least one memory 440 and the computer program code 450 can be configured to, with the at least one processor 460, cause the local device 420 at least to define a suitable transmission power, and a highest value and a lowest value. Defining these values may be performed in connection with calculating the probability. Likewise, the at least one memory 440 and the computer program code 450 can be configured to, with the at least one processor 460, cause the local device 420 at least to calculate the probability according to Equation (5) or Equation (6).

The at least one memory 440 and the computer program code 450 can be configured to, with the at least one processor 460, cause the local device 420 at least to compute the probability of the access without using a nominal power level obtained by downlink signaling. Additionally, the at least one memory 440 and the computer program code 450 can be configured to, with the at least one processor 460, cause the local device 420 at least to measure with a granularity of one physical resource block.

Moreover, the at least one memory 440 and the computer program code 450 can be configured to, with the at least one processor 460, cause the local device 420 at least to maintain information about a highest interference power level and a lowest interference power level in a sliding-window measurement period. Likewise, the at least one memory 440 and the computer program code 450 can be configured to, with the at least one processor 460, cause the local device 420 at least to calculate a suitable power level for local data transmissions based on a highest measured interference power level.

In the example of a cluster head device 430, the at least one memory 440 and the computer program code 450 can be configured to, with the at least one processor 460, cause the cluster head device 430 at least to form collective high and low values from interference measurements performed by a plurality of local devices. The at least one memory 440 and the computer program code 450 can also be configured to, with the at least one processor 460, cause the cluster head device 430 at least to calculate and decide access for the plurality of local devices. The at least one memory 440 and the computer program code 450 can further be configured to, with the at least one processor 460, cause the cluster head device 430 at least to control the access of the plurality of local devices based on the calculating and deciding.

The at least one memory 440 and the computer program code 450 can be configured to, with the at least one processor 460, cause the cluster head device 430 at least to form collective high and low values based on processing received individual high and low values from the plurality of local devices. Likewise, the at least one memory 440 and the computer program code 450 can be configured to, with the at least one processor 460, cause the cluster head device 430 at least to calculate and decide at least one of transmit power setting, resource allocation, transmission probability, or carrier reselection.

The at least one memory 440 and the computer program code 450 can also be configured to, with the at least one processor 460, cause the cluster head device 430 at least to compute a probability of the access without using a nominal power level obtained by downlink signaling, and to use the probability of the access in the deciding the access. Furthermore, the at least one memory 440 and the computer program code 450 can be configured to, with the at least one processor 460, cause the cluster head device 430 at least to control the access by sending an access grant message to each or all of the local devices. Moreover, the at least one memory 440 and the computer program code 450 can be configured to, with the at least one processor 460, cause the cluster head device 430 at least to control the access by sending a list of allowed resources to one or more of the local devices.

Figure 5:
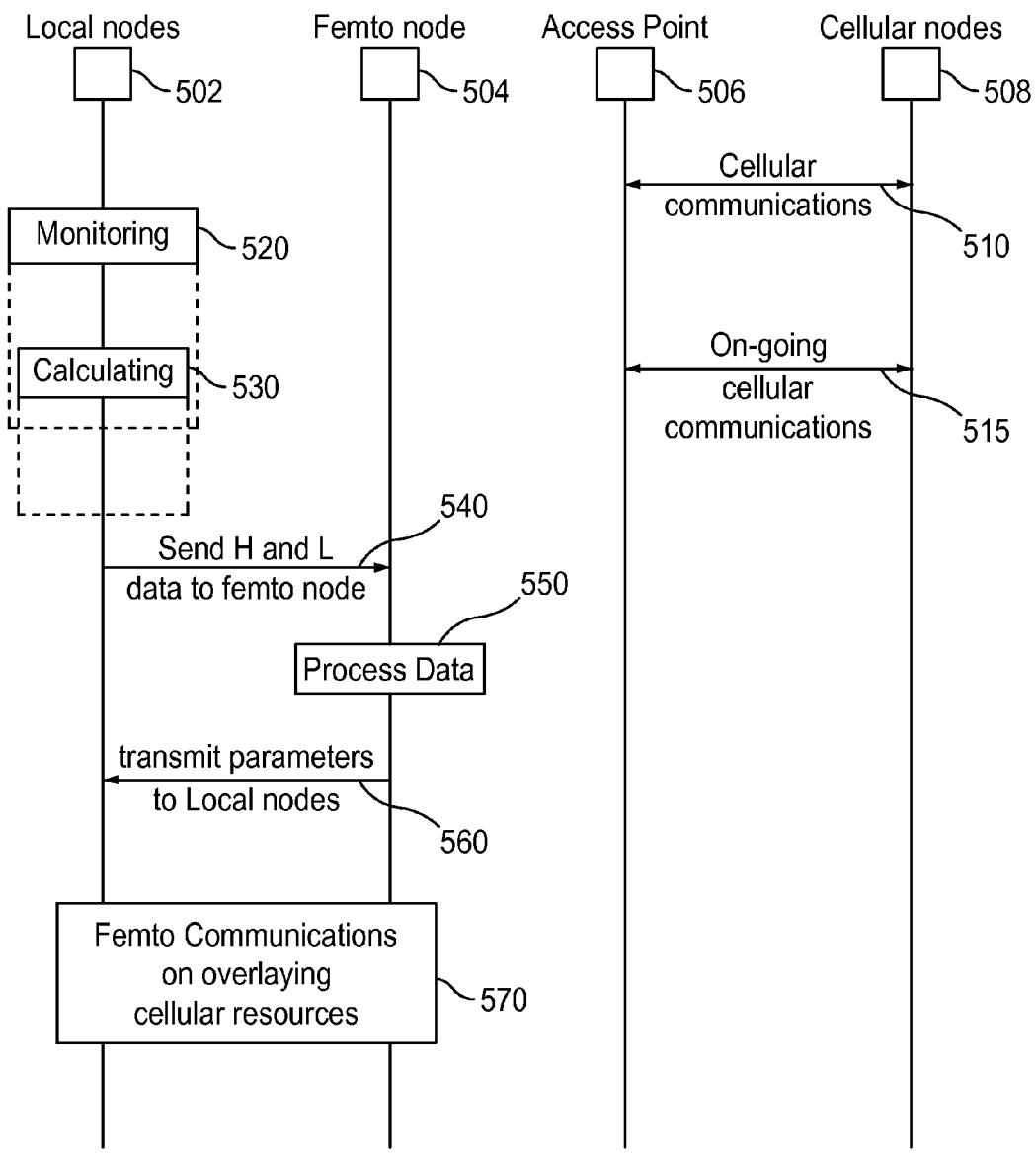
FIG. 5 illustrates a signaling flow according to certain embodiments of the present invention.

FIG. 5 illustrates a signaling flow diagram according to certain embodiments of the present invention. As shown in FIG. 5, the access point 506 and the cellular nodes 508 may engage in routine cellular communications 510. During this time, the local nodes 502 (and optionally the femto node 504), can engaging in monitoring 520 the cellular communications 510.

Next, the local nodes 502 can perform calculating 530 based on measurements obtained during the monitoring 520. There may be on-going cellular communication 515, and consequently the monitoring 520 and the calculating 530 may be performed on an on-going basis, such that a sliding window of data is obtained.

Subsequently, the local nodes 502 may send 540 the results of their calculations, such as H and L values (discussed above) to the femto node 504. Then the femto node 504 can process 550 the data that it received from the local nodes 502, together with any additional data available to it. The processing can result in collective H and L values. Additionally, the processing can lead to the femto node 504 deciding transmit power setting, resource allocation, transmission probability, or carrier reselection based on the collective values or metrics.

One having ordinary skill in the art will readily understand that the invention as discussed above may be practiced with steps in a different order, and/or with hardware elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention. For example, the particular network elements indicated can be called by different names and similar network elements in analogous communication systems can be substituted for the network elements shown in the examples, without departing from the spirit and scope of the invention. In order to determine the metes and bounds of the invention, therefore, reference should be made to the appended claims.

We claim:

1. A method, comprising:
   measuring, by a local device, interference levels on uplink resources of a victim cell;
   calculating a probability of accessing channels of the uplink resources of the victim cell using the interference levels measured by the local device, wherein the calculating the probability comprises defining a suitable transmission power, and a highest value and a lowest value;
   accessing, by the local device, a channel for which the probability of accessing has been calculated, when the probability meets a predetermined condition.

2. The method of claim 1, wherein determining, based on the further measuring, whether the minimum power level can be ensured; and
   triggering carrier reselection in response to the further measuring when a result of the determining is that the minimum power level cannot be ensured in the carrier.

3. The method of claim 1, wherein the calculating comprises calculating the probability as follows:

$p_{channelAccess} = \max(0, p - \text{mean}(\text{value}_{data}(1,t), \ldots, \text{value}_{data}(N,t)))/(p-L)$.

4. The method of claim 1, wherein the calculating comprises calculating the probability for candidate transmission resource j as follows:

$p_{channelAccess} = \max(0, p - \text{value}_{data}(j,t))/(p-L)$.

5. The method of claim 1, wherein the probability of the access is computed without using a nominal power level obtained by downlink signaling.

6. The method of claim 1, further compromising:
   maintaining information about a highest interference power level and a lowest interference power level in a sliding-window measurement period.

7. The method of claim 1, further comprising:
   calculating a suitable power level for local data transmissions based on a highest measured interference power level value.

8. A method, comprising:
   forming collective high and low values from interference measurements performed by a plurality of local devices;
   calculating and deciding access for the plurality of local devices; and
   controlling the access of the plurality of local devices based on the calculating and deciding,
   wherein a probability of the access is computed without using a nominal power level obtained by downlink signaling, and wherein the probability of the access is used in the deciding the access.

9. The method of claim 8, wherein the forming collective high and low values is based on processing received individual high and low values from the plurality of local devices.

10. The method of claim 8, wherein the calculating and deciding the access comprises calculating and deciding at least one of transmit power setting, resource allocation, transmission probability, or carrier reselection.

11. An apparatus, comprising:
    at least one memory including computer program code; and
    at least one processor,
    wherein the at least one memory and the computer program code are configured to, with the at least one processor, cause the apparatus at least to
    measure interference levels on uplink resources of a victim cell,
    calculate a probability of accessing channels of the uplink resources of the victim cell using the interference levels measured by the apparatus, wherein calculating the probability of accessing channels comprises defining a suitable transmission power, and a highest value and a lowest value,
    access a channel for which the probability of accessing has been calculated, when the probability meets a predetermined condition.

12. The apparatus of claim 11, wherein the at least one memory and the computer program code are further configured to, with the at least one processor, cause the apparatus at least to
    determine, based on the further measuring, whether the minimum power level can be ensured, and
    trigger carrier reselection in response to the further measuring when a result of the determining is that the minimum power level cannot be ensured in the carrier.

13. The apparatus of claim 11, wherein the at least one memory and the computer program code are configured to, with the at least one processor, cause the apparatus at least to calculate the probability as follows:

$p_{channelAccess} = \max(0, p - \text{mean}(\text{value}_{data}(1,t), \ldots, \text{value}_{data}(N,t)))/(p-L)$.

14. The apparatus of claim 11, wherein the at least one memory and the computer program code are configured to, with the at least one processor, cause the apparatus at least to calculate the probability for candidate transmission resource j as follows:

$p_{channelAccess} = \max(0, p - \text{value}_{data}(j,t))/(p-L)$.

15. The apparatus of claim 11, wherein the at least one memory and the computer program code are configured to, with the at least one processor, cause the apparatus at least to compute the probability of the access without using a nominal power level obtained by downlink signaling.

16. The apparatus of claim 11, wherein the at least one memory and the computer program code are configured to, with the at least one processor, cause the apparatus at least to maintain information about a highest interference power level and a lowest interference power level in a sliding-window measurement period.

17. The apparatus of claim 11, wherein the at least one memory and the computer program code are configured to, with the at least one processor, cause the apparatus at least to calculate a suitable power level for local data transmissions based on a highest measured interference power level value.

* * * * *